US 6,544,327 B1

(12) United States Patent
Griessmann et al.

(10) Patent No.: US 6,544,327 B1
(45) Date of Patent: Apr. 8, 2003

(54) PIGMENT PREPARATION

(75) Inventors: Carsten Griessmann, Gross-Zimmern (DE); Wolfgang Hechler, Lautertal (DE); Gerhard Herget, Ober-Ramstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 09/646,190

(22) PCT Filed: Mar. 23, 1999

(86) PCT No.: PCT/EP99/01940

§ 371 (c)(1),
(2), (4) Date: Sep. 14, 2000

(87) PCT Pub. No.: WO99/48988

PCT Pub. Date: Sep. 30, 1999

(30) Foreign Application Priority Data

Mar. 26, 1998 (DE) .......................................... 198 13 394

(51) Int. Cl.[7] .............................. C09C 1/00; C09D 17/00
(52) U.S. Cl. .................. 106/417; 106/31.6; 106/31.67; 106/31.69; 106/31.9; 106/415; 106/416; 106/418; 106/439; 106/445; 106/446; 106/447; 106/457; 106/487; 106/490; 106/491; 106/499; 106/501.1; 106/504; 428/403; 428/404; 428/407; 524/437; 524/442; 524/447; 524/449

(58) Field of Search ................................. 106/417, 446, 106/457, 499, 31.6, 31.67, 31.69, 31.9, 415, 416, 418, 439, 445, 447, 487, 490, 491, 501.1, 504; 428/403, 404, 407; 524/437, 442, 447, 449

(56) References Cited

U.S. PATENT DOCUMENTS

| 4,986,853 | A | * | 1/1991 | Kieser | .......................... 106/415 |
| 5,656,375 | A |   | 8/1997 | Glausch | ....................... 428/403 |
| 5,993,526 | A | * | 11/1999 | Sommer et al. | ......... 106/31.65 |
| 6,432,195 | B1 | * | 8/2002 | Rathschlag et al. | ......... 106/500 |

FOREIGN PATENT DOCUMENTS

| DE | 197 08 167 | | 9/1998 |
| EP | 0 285 977 | | 10/1988 |
| EP | 0 803 552 | | 10/1997 |
| GB | 1 357 319 | | 6/1974 |
| JP | 2-233285 | * | 9/1990 |
| WO | WO-97/08255 | * | 3/1997 |

* cited by examiner

Primary Examiner—Anthony J. Green
(74) Attorney, Agent, or Firm—Millen, White, Zelano & Branigan, P.C.

(57) ABSTRACT

The invention relates to a non-dusting homogeneous pigment preparation which is notable in that it comprises at least 40% by weight of one or more effect pigments, from 0.5 to 60% by weight of an aldehyde resin and/or ketonic resin and from 0.1 to 10% by weight of a redispersant.

28 Claims, No Drawings

PIGMENT PREPARATION

The invention relates to a non-dusting homogeneous pigment preparation notable in that it comprises at least 40% by weight of one or more effect pigments, 0.5–60% by weight of an aldehyde or ketonic resin and 0.10–10% by weight of a redispersant, based on the pigment.

In industrial processes, pigments are seldom employed in the form of dry powders, since the latter produce dust, which leads to increased requirements in terms of workplace safety. In many cases, furthermore, when introducing powders into plastics, basecoat systems, etc., agglomeration of the pigment powder is observed. Homogeneous distribution of the pigment in the respective matrix is frequently difficult if not impossible to achieve.

Instead of the pigment powder, non-dusting pigment formulations are used. These formulations are
free-flowing powders, where pearl lustre pigments are coated with polymers, as are described, for example, in DE-C-2603211,
pigmented free-flowing powders having a low moisture content, as are known, for example, from DE-A-4139993,
pigmented powders having a relatively high moisture content, which owing to their flowable consistency are frequently referred to as pastes, or
dry preparations as precursors for printing inks, as are known, for example, from EP 0 803 552.

Pastes, and dry preparations prepared from them, are a technical alternative to the dry or moistened powders provided they meet the following general conditions:
flowable consistency
minimal dilatancy
maximum pigment content The components of the preparation/paste should be chosen such that the formulation is customized to suit the other components of the respective coating system and is readily homogeneously distributed following its introduction.

In addition to good compatibility with the other constituents of the coating system, pigment preparations are required to exhibit high stability; that is, they must not tend towards phase separation. This requirement is particularly important in the case of pigment preparations based on platelet-shaped pigments, since owing to their structure such pigments have a tendency to undergo caking on phase separation and are difficult to reagitate. Pigments based on platelet-shaped substrates give rise to handling problems insofar as, owing to the size and density of the pigments, they readily settle and may then cake together to form a very firm sediment cake. This cake is generally difficult to reagitate. It is particularly so in connection with the storage of varnishes, paints and printing inks and their processing.

Thus numerous methods have been developed, inter alia, in order to solve the problem of the incorporation and handling of platelet-shaped pigments in coating compositions. Reagitation can be facilitated by treating the coating compositions with additives which alternatively bring about controlled flocculation (house of cards effect), pseudoplastic and/or thixotropic behaviour, or steric and/or electrostatic repulsion of the pigments. However, these additives may have an adverse effect on the quality of the coating. In particular, the brightness in the case of effect pigments, and the uniformity of the coating, may be impaired.

In addition, homogeneous, stable distribution of the redispersants in the pearl lustre pigment powder is difficult to achieve, and/or the redispersant loses some of its activity in the course of mixing.

The formulations with effect pigments that have been developed to date for use in coating systems, with a pigment content of >30% by weight, frequently do not go far enough towards meeting the requirements described, in particular in that they have a tendency towards agglomeration and shear thickening.

The object of the present invention was therefore to provide pigment preparations, in particular in the form of pastes and dry preparations, which can be used to very good effect in solvent-containing coating systems, possess high stability, are readily redispersed, and at the same time feature a high level of compatibility with the other components of the coating system. Furthermore, the pigment preparation of the invention ought also to be suitable for producing dry preparations in the form, for example, of pellets, granules, etc.

Surprisingly it has been found that this object can be achieved by the provision of the pigment preparation of the invention.

The invention therefore provides a non-dusting homogeneous pigment preparation which comprises
$\geq 40\%$ by weight of one or more effect pigments,
0.5–60% by weight of an aldehyde or ketonic resin,
0.10–10% by weight of a redispersing auxiliary, and, if desired,
40% by weight of an organic solvent or solvent mixture.

Depending on its moisture content, the preparation of the invention is a flowable paste or a moistened, free-flowing powder. Both paste and powder are high suited to the production of dry preparations, examples being granules, pellets, and briquettes. The dry preparations produced from the pigment formulation of the invention are likewise provided by the invention.

Effect pigments used are pigments based on platelet-shaped, transparent or semitransparent substrates comprising, for example, phyllosilicates, such as mica, synthetic mica, $SiO_2$ flakes, $TiO_2$ flakes, holographic pigments, talc, sericite, kaolin, or comprising glass or other silicatic materials which are coated with coloured or colourless metal oxides, such as $TiO_2$, titanium suboxides, titanium oxynitrides, $Fe_2O_3$, $Fe_3O_4$, $SnO_2$, $Cr_2O_3$, ZnO, CuO, NiO and other metal oxides, alone or in a mixture, in one uniform layer or in successive layers (multilayer pigments). Pearl lustre pigments are known, for example, from the German Patents and Patent Applications 14 67 468, 19 59 998, 20 09 566, 22 14 454, 22 15 191, 22 44 298, 23 13 331, 25 22 572, 31 37 808, 31 37 809, 31 51 343, 31 51 354, 31 51 355, 32 11 602, 32 35 017 and P 38 42 330 and are obtainable commercially, for example under the brand name Iriodin® from Merck KGaA, Darmstadt, FRG. Particularly preferred pigment preparations comprise $TiO_2$/mica, $Fe_2O_3$/mica and/or $TiO_2/Fe_2O_3$ mica pigments. The $SiO_2$ flakes can be coated, for example, as described in WO 93/08237 (wet-chemical coating) or DE-A 196 14 637 (CVD process).

The pigment preparations of the invention can comprise one or more effect pigments. In many cases it is possible by using at least two different effect pigments to obtain special colour effects and lustre effects. Preferred pigment preparations comprise one or more effect pigments based on mica and/or $SiO_2$ flakes.

The pigment preparation of the invention comprises preferably 40–60% by weight of effect pigments, in particular 45–60% by weight. Very particular preference is given to pigment preparations having a content of effect pigments o more than 50% by weight.

As a mandatory component the pigment preparation of the invention comprises a ketonic and/or aldehyde resin in amounts of from 0.5 to 60% by weight, preferably from 5 to 40% by weight and, in particular, from 10 to 30% by weight.

All ketonic or aldehyde resins known to the person skilled in the art can be used, especially ketonic and aldehyde resins marketed under the brand name Laropal K80 and Laropal A81 by BASF.

Suitable ketonic resins are obtainable by alkali-catalyzed self-condensation of ketones, for example cyclohexanone or methylcyclohexanone, or by cocondensation of ketones, such as acetone, butanone, acetophenone, cyclohexanone or methylcyclohexanone, with formaldehyde. The resulting ketonic resins are non-hydrolyzable and pale neutral resins which generally soften within the range 80–130° C. Suitable aldehyde resins are polycondensation products obtainable by treating aldehydes, especially acetaldehyde, with strong alkalis.

In accordance with the invention it is preferred to employ those resins which have a low softening or melting point, since in that case the preparations can be produced by an elegant melt process. On the other hand, however, the softening point must not be below room temperature, since then blocking and deficient flow of the dry preparation in the form, for example, of granules can be expected.

As a third mandatory component, the pigment preparation of the invention comprises a redispersing auxiliary, preferably spherical particles, a polyacrylate or polymethacrylate, or fibriform particles with a fibre length of 0.1–20 $\mu$m, in amounts of from 0.1 to 10% by weight, preferably from 0.05 to 5% by weight and, in particular, from 0.01 to 3% by weight, based on the pigment.

The addition of a redispersing auxiliary in the form of bulky particles, such as fibres or spherical particles, for example, prevents the effect pigments treated in accordance with the process of the invention from lying on top of one another to a notable extent as a result of the steric repulsion and so exerting strong adhesion. The result of this is that
1. the preparations of the invention are more stable, and
2. owing to the introduction of the redispersing aid into the varnish or paint system by way of the pigment preparation, the effect pigments undergo in some cases very much slower settling in varnish and paint systems; in all cases, however, the sediment is less hard, and no problems occur when the sediment is reagitated.

All organic and inorganic fibres that are known to the person skilled in the art and have a fibre length of 0.1–20 $\mu$m can be used. Particularly suitable particles are all synthetic fibres made, for example, from polyethylene, polyacrylates, polypropylene, polyamides and cellulose fibres, inorganic fibres, preferably silicon compounds, glass fibres and, in particular, the condensation products of modified isocyanates and mono- and diamines.

These condensation products, which are diurea derivatives and aminoureas having urethane groups, are known as thixotropic agents and, together with a binder, are added to paints and varnishes in order to improve the running properties and the brushability.

Redispersing auxiliaries which can be used are all those diurea derivatives and urethane compounds known to the person skilled in the art, as are described, for example, in EP 0 198 519, DE 18 05 693.4 and in Organic Coatings: Science and Technology, A. Heenriga, P. J. G. von Hemsbergen, pp. 201–222, New York 1983.

Suitable spherical materials are, in particular, hollow glass, wax or polymer beads made from vinyl resins, nylon, silicone, epoxy resins, oleflin resins or polystyrenes, and inorganic materials, such as $TiO_2$, $SiO_2$ or $ZrO_2$, for example. Preference is given to the use of hollow beads, and also solid beads, having a particle size of from 0.05 to 150 $\mu$m. With particular preference, hollow glass, wax or polymer beads are employed in the pigment preparation of the invention.

Spherical particles based on $SiO_2$ in a particle range of 3–10 $\mu$m are known, for example, as materials for high performance liquid chromatography and are marketed, for example, as LiChrospher® by Merck KGaA, Darmstadt, FRG. Such materials are preferably employed in monodisperse form; that is, with a substantially uniform particle size. Monodisperse spherical particles of this type based on $SiO_2$, $TiO_2$ and $ZrO_2$ are known. Monodisperse $SiO_2$, for example, can be prepared in accordance with DE 36 16 133. Hollow glass beads are marketed, for example, under the trade name Q-CEL by PQ Corporation, USA, or Scotchlite by 3M, Frankfurt, FRG.

In addition, the pigment preparation of the invention may comprise surface-active substance, such as alkylsilanes, which may also contain a further functional group, or unsaturated or saturated fatty acids or fluorosurfactants. Particular preference is given to the use of silane compounds of the formula $(C_nH_{2n+1})Si(OC_mH_{2m+1})_3$, in which n is 1–30 and m is 1–10, as surface-active substances. Examples of suitable silane compounds are n-hexyldecyltriethoxysilane and n-octyldecyltriethoxysilane (Si 116 and Si 118, respectively, from Degussa AG, Frankfurt, FRG), and the corresponding fluoroalkylsilanes.

Further surface-active substances which can be employed are the saturated and unsaturated fatty acids, such as caproic, caprylic, capric, lauric, myristic, palmitic, stearic, oleic and linoleic acid, and also mixtures of fatty acids.

In addition to the silane, the pigment preparation preferably comprises in addition a surfactant or a fatty acid. The surface-active reagent may also be a mixture of silane, fatty acids and/or surfactants. The pigment preparations can comprise from 0.1 to 5% by weight, preferably from 0.2 to 3% by weight and, in particular, from 0.5 to 2% by weight of surface-active substances, based on the pigment.

The pigment preparation of the invention may additionally comprise from 0 to 40% by weight of an organic solvent or solvent mixture, preferably from 5 to 35% by weight, in particular from 10 to 30% by weight.

The solvent component in the pigment preparation of the invention must be tailored to the ketonic resin and aldehyde resin in accordance with the art. For the preparation it is possible to employ all organic solvents. Examples of suitable solvents are aromatic solvents, such as toluenes, benzines, mineral oils, hydrocarbons, esters, long-chain amines, vegetable oils, monohydric aliphatic alcohols, such as those having 2 to 4 carbon atoms, examples being ethanol, butanol or isopropanol, or ketones, such as acetone or methyl ethyl ketone, or glycol ethers, such as propylene glycol monomethyl ether, propylene glycol monoethyl ether, or diols, such as ethylene glycol and propylene glycol, or polyether diols, aliphatic triols and tetrols having 2 to 6 carbon atoms, such as trimethylolethane, trimethylolpropane, glycerol, 1,2,4-butanetriol, 1,2,6-hexanetriol and pentaerythritol, and also all other solvents from other classes of compound, and/or mixtures of the abovementioned solvents. Preference is given to the use of those solvents listed in Karsten, Lackrohstofftabellen, 8th edition, 1987.

The production of the pigment preparation of the invention takes place simply, by adding the ketonic resin and/or aldehyde resin, with or without an organic solvent or solvent mixture, the redispersing auxiliary and, if desired, further additives simultaneously or in succession to the effect pigment or effect pigment mixture and subjecting this mixture to gentle homogenization in a mixing device, in particular, an automatic disperser. Preferably, the pigment is introduced initially and first pasted up with stirring with the solvent comprising the ketonic resin and/or aldehyde resin and possibly even at this stage the redispersant; subsequently, if desired, a further solution consisting of solvent, additives and the redispersing aid is added. If desired, a first drying stage may be carried out even at this point, in which case the drying temperature can be between 80° and 150°.

During or after its preparation, further customary additives can be added to the pigment preparation of the invention, examples being pH regulators, defoamers, wetting agents, antisettling agents, levelling agents, siccatives or thixotropic agents. These are auxiliaries customary in the coatings industry, which may be present in the pigment preparation of the invention in an amount of from 0 to 10% by weight.

In particular, it is also possible to add those substances which accelerate or assist the breakdown and dissolution of the pigment granules, examples being bulky spherical particles, such as hollow spheres or hemispheres.

The resultant pigment preparation of the invention is a homogeneous powder, or readily flowable pastes, with a relatively high content of effect pigments. Because of the particularly high level of compatibility of the ketonic/aldehyde resin, the pigment preparation of the invention is likewise thoroughly compatible with customary commercial systems. Further features which distinguish the preparation are its freedom from dust, ready dispersibility and redispersibility, high storage stability and good processing properties, and it is therefore markedly superior to conventional pigment preparations.

The flowable pigment preparation is very well suited to the filling of tubes, and for extrusion. In order to produce dry preparations, the pigment preparation of the invention is extruded or is compressed into a compact particle form by other methods known to the skilled worker, for example, by means of tableting, briquetting, pelletizing, granulating, spray-granulating or extrusion, and may then be dried. The drying procedure generally takes place at temperatures from 20° to 150° C., lasts for between 0.5 and 4 h, and may possibly be carried out under reduced pressure. Finally, if desired, the dry preparation is classified or comminuted. The granules, for example, obtained in this way are likewise non-dusting and possess particle sizes in the range of 0.1–150 mm, preferably 0.1–20 mm, in particular 0.1–2 mm. The storage and transportation of the dry preparations is less restricted and therefore highly unproblematic.

The dry preparations have the further advantage that they carry little or no liquid and are therefore of increased stability.

These dry preparations can be incorporated into all binders known to the person skilled in the art for varnishes, paints and printing inks, especially solvent-based systems.

Owing to the good compatibility of the ketonic resins and aldehyde resins, suitable binder resins are those which are commonly added to paints and varnishes and are listed, for example, in Karsten, Lackrohstofftabellen, 8th edition, 1987. Suitable binders are all of those binders or binder mixtures that are customarily used for printing inks, examples being those based on cellulose, polyacrylate resins, polymethacrylate resins, alkyd resins, polyester resins, polyphenol resins, urea resins, melamine resins, polyterpene resins, polyvinyl resins, polyvinyl chloride resins, polyvinyl pyrrolidone resins, polystyrenes, polyolefins, indene-coumarone, hydrocarbon resins, ketonic resins, aldehyde resins, aromatic-formaldehyde resins, carbamic acid resins, sulphonamide resins, epoxy resins, polyurethanes and/or natural oils or derivatives of the substances mentioned. The effect pigment preparation of the invention has been found to exhibit particularly good redispersibility when cellulose and/or cellulose compounds are employed as binders.

The integration of a redispersing aid ensures that even in the finished varnish and paint systems the pigment preparations of the invention are easy to stir and require no further improvement by the end formulator.

The improved deagglomeration of the dry preparations when incorporated into a binder, such as into a printing ink, for example, is evident even with small amounts of spherical particles in the pigment preparation. For instance, even when using granules having a content of 0.5% by weight of spherical particles based on the dry pigment, the dissolution rate is markedly increased and the stability of the printing ink is obtained more quickly (viscosity/hue).

As a paste or as a dry preparation, the preparation of the invention can be used for diverse applications. It is preferably employed in coating systems from the sectors of printing, especially offset printing and intaglio printing, varnish and paint. With particular preference, the preparation is applied as a precursor for coating compositions on any desired substrate materials, examples being metals such as iron, steel, aluminium, copper, bronze, brass and metal foils, and also metal-clad surfaces of glass, ceramic and concrete, as well as on wood, e.g. furniture, clay, textile, paper, packaging materials, such as plastic containers, films, or card, or on other materials for decorative and/or protective purposes.

The invention therefore also provides for the use of the pigment preparation in formulations such as paints, varnishes, printing inks and plastics.

The examples which follow are intended to illustrate the invention in greater detail without, however, restricting it.

EXAMPLES

Example 1

Pigment Granules for Solvent-based Intaglio Printing Inks 1000 g of Iriodin® 123 (TiO$_2$ mica pigment of particle size 5 to 25 µm from Merck KGaA, FRG) in a mixing granulator RO2 from Eirich are admixed with a solution consisting of 250 g of Laropal A81 (aldehyde resin from BASF, FRG) and 188 g of ethanol, and the constituents are then mixed thoroughly. In order to obtain a coarse particle size, a further 200 g of ethanol are added to the pigment paste.

The resulting granules with particles sizes of 1–10 mm are finally dried in a vacuum dryer at 80° C.

Example 2

Pigment Granules for Solvent-based Intaglio Printing Inks

In analogy to Example 1, 1000 g of Iriodin® 123, 176.5 g of Laropal A81 and 300 g of ethanol are used to prepare granules having a particle size of 0.1–3 mm.

Example 3

In a mixing granulator, Evactherm from Eirich, fitted with a heating jacket, 30 kg of Iriodin® 123 and 7.5 kg of Laropal A81 (BASF) are first of all mixed homogeneously at a temperature of 120° C. and, once uniform distribution is achieved, are granulated at an appropriate setting. The experimental material is cooled and discharged. The granular particles are between 0.1 and 2 mm large and can be dispersed in the solvent-based test binder at a comparable rate to the granules of Example 2.

Example 4

Analogous to Example 3, except that 300 g of hollow glass beads (from 3M) are added as well. The granulated particles obtained can be dispersed very rapidly.

Example 5

In an Evactherm mixing granulator from Eirich, fitted with a heating jacket, 300 kg of Iriodin® 123 are admixed first with 1.8 kg of an acetic acid solution (pH=3) and then with a solution of 600 g of n-octyltrimethoxysilane (from Degussa) in 1800 g of ethanol, after which the components are mixed under a vacuum and dried.

Subsequently, 7.5 kg of Laropal A81 are admixed and the mixture is granulated as described in Example 3. The granular particles are between 0.1 and 3 mm large and can be dispersed very rapidly in the solvent-based binder.

Example 6

In a mixing granulator, Evactherm from Eirich, fitted with a heating jacket, 300 kg of Iriodin® 123 and 7.5 kg of Erkapol VP1880 ketonic resin (from Lackharzwerke Robert Kraemer) are first of all mixed homogeneously at a temperature of 120° C. and, once uniform distribution is achieved, are granulated at an appropriate setting. The experimental material is cooled and discharged. The granular particles are between 0.1 and 2 mm large and can be dispersed in the solvent-based test binder at a comparable rate to the granules of Example 2.

Example 7

Analogous to Example 6, except that 500 g of Setal SS50 (fibres comprising diurea derivatives; from Akzo) are added in addition. The granular particles obtained can be dispersed very rapidly and, following a 2-week stand test, the sedimented pearl lustre pigment is particularly easy to reagitate.

What is claimed is:

1. A non-dusting homogeneous pigment preparation comprising:
   - $\geq 40\%$ by weight of one or more effect pigments,
   - 0.5–60% by weight of an aldehyde or ketonic resin,
   - 0.01–10% by weight of a redispersing auxiliary, and
   - 0–40% by weight of an organic solvent or solvent mixture.

2. A non-dusting homogeneous pigment preparation according to claim 1, wherein said one or more effect pigments comprise a pearl lustre pigment, an $SiO_2$ platelet coated with one or more metal oxides, or combinations thereof.

3. A non-dusting homogenous pigment preparation according to claim 2, wherein said pearl lustre pigment is a $TiO_2$/mica pigment or $Fe_2O_3$ mica pigment.

4. A non-dusting homogenous pigment preparation according to claim 2, wherein said $SiO_2$ platelet is coated with $TiO_2$ and/or $Fe_2O_3$.

5. A non-dusting homogenous pigment preparation according to claim 1, wherein said ketonic resin is a cyclohexanone resin.

6. A non-dusting homogenous pigment preparation according to claim 1, wherein said redispersing auxiliary is a polyacrylate, a polymethacrylate, fibriform particles or spherical particles.

7. A pigment preparation according to claim 6, wherein said redispersing auxiliary is spherical particles having a particle size of 0.05 to 150 μm.

8. A non-dusting homogenous pigment preparation according to claim 1, further comprising one or more additional components selected from the group consisting of defoamers, surface-active substances, wetting agents, anti-settling agents, leveling agents, siccatives, thixotropic agents and combinations thereof.

9. A dry preparation produced by shaping a non-dusting homogenous pigment preparation according to claim 1 by tableting, briquetting, pelletizing, granulating, spray-granulating or extruding.

10. In the preparation of a formulation for use as a paint, varnish, printing ink, or plastic, comprising bringing said formulation into compact particle form and, optionally, freeing said formulation from solvent, the improvement wherein said formulation contains a pigment preparation according to claim 1.

11. A non-dusting homogenous pigment preparation according to claim 1 in the form of solvent-free, free-flowing granules.

12. A pigment preparation according to claim 1, wherein said preparation is in the form of a flowable paste.

13. A pigment preparation according to claim 1, wherein said preparation is in the form of a moistened, free-flowing powder.

14. A pigment preparation according to claim 1, wherein said one or more effect pigments are selected from the group consisting of effect pigments based on platelet-shaped, transparent or semi-transparent substrates, wherein said substrates are selected from mica, synthetic mica, $SiO_2$ flakes, $TiO_2$ flakes, $Al_2O_3$ flakes, holographic pigments, talc, sericite, kaolin, or silicate materials, which are coated with one or more colored or colorless metal oxide layers.

15. A pigment preparation according to claim 1, wherein said preparation contains 40–60% by weight of one or more effect pigments.

16. A pigment preparation according to claim 1, wherein said preparation contains 5–40% by weight of aldehyde resin or ketonic resin.

17. A pigment preparation according to claim 1, wherein said preparation contains 0.05–5% by weight of a redispersing agent.

18. A pigment preparation according to claim 1, wherein said preparation contains 5–35% by weight of an organic solvent or solvent mixture.

19. A pigment preparation according to claim 1, wherein said resin is a ketonic resin.

20. A pigment preparation according to claim 19, wherein said ketonic resin is obtained by alkali-catalysed self-condensation of cyclohexanone or methylcyclohexanone.

21. A pigment preparation according to claim 19, wherein said ketonic resin is obtained by co-condensation of acetone, butanone, acetophenone, cyclohexanone or methylcyclohexanone with formaldehyde.

22. A pigment preparation according to claim 1, wherein said resin is an aldehyde resin.

23. A pigment preparation according to claim 22, wherein said aldehyde resin is obtained by treating aldehydes with an alkali.

24. A pigment preparation according to claim 22, wherein said aldehyde resin is obtained by treating acetaldehyde with an alkali.

25. A pigment preparation according to claim 1, wherein said preparation further comprises, as a surface active agent, a compound of the formula $(C_nH_{2n+1})Si(OC_mH_{2m+1})_3$, wherein n is 1–30 and m is 1–10.

26. A pigment preparation according to claim 1, wherein said preparation further comprises, as a surface active agent, caproic acid, caprylic acid, capric acid, lauric acid, myristic acid, palmitic acid, stearic acid, oleic acid, linolaic acid, or combinations thereof.

27. A coating composition or ink composition comprising a pigment preparation according to claim 1 and a binder comprising cellulose, polyacrylate, polymethacrylayte, alkyd, polyester, polyphenol, urea, melamine, polyterpene, polyvinyl, polyvinyl chloride, polyvinylpyrrolidone, polystyrene, polyolefin, indene-coumarone, carbamic acid, sulfanimide, or epoxy resins.

28. A pigment preparation according to claim 1, wherein said preparation is prepared by combining the effect pigment with the solvent or solvent mixture, resin, and redispersing auxiliary with stirring, drying the resultant mixture at 80–150° C., extruding or consolidating the resultant mixture to form compact particles and optionally drying the resultant particles at 20–150° C. under reduced pressure, and classifying the particles to a particle size of 0.1–150 μm.

* * * * *